United States Patent [19]

Ou

[11] Patent Number: 5,368,794
[45] Date of Patent: Nov. 29, 1994

[54] METHOD OF MAKING PLASTIC REINFORCED BY NATURAL FIBERS

[76] Inventor: Jerry Ou, No. 231, Cheng Kung 3rd Road, Nantou City, Taiwan, Prov. of China

[21] Appl. No.: 37,404

[22] Filed: Mar. 26, 1993

[51] Int. Cl.$^5$ .............................................. B29C 67/22
[52] U.S. Cl. ..................... 264/45.3; 264/51; 264/53
[58] Field of Search ..................... 264/45.3, 53, 51

[56] References Cited

U.S. PATENT DOCUMENTS

| | | | |
|---|---|---|---|
| 3,917,774 | 11/1975 | Sagane et al. | 264/45.3 |
| 3,993,609 | 11/1976 | Kamens et al. | 264/45.3 |
| 4,148,854 | 4/1979 | Cordts et al. | 264/45.3 |
| 4,159,294 | 6/1979 | Oishi et al. | 264/45.3 |
| 4,211,848 | 7/1980 | Blount | 264/45.3 |
| 4,268,574 | 5/1981 | Peccenini et al. | 264/DIG. 6 |
| 4,314,036 | 2/1982 | Throne et al. | 264/45.3 |
| 4,680,214 | 7/1987 | Frisch et al. | 264/45.3 |
| 5,242,637 | 9/1993 | Inoue et al. | 264/45.3 |

FOREIGN PATENT DOCUMENTS

| | | | |
|---|---|---|---|
| 48-027915 | 8/1973 | Japan | 264/45.3 |
| 58-145431 | 8/1983 | Japan | 264/45.3 |
| 59-078839 | 5/1984 | Japan | 264/45.3 |

*Primary Examiner*—Allan R. Kuhns
*Attorney, Agent, or Firm*—Browdy and Neimark

[57] ABSTRACT

A method of making a plastic reinforced by natural fibers which comprises natural fibers and a mixture prepared by combining per 100 parts by weight of an unsaturated polyester with 30–300 parts by weight of an organic foaming agent, 0.5–3.0 parts by weight of an organic peroxidase, and a predetermined quantity of a wood powder filling agent. The method includes the steps of (a) preparing a filling agent mixture by adding a predetermined quantity of a filling agent to a foaming agent; (b) preparing an unsaturated polyester mixture by adding the filling agent mixture of step (a) and a catalyst to the unsaturated polyester; and (c) impregnating the natural fibers in the unsaturated polyester mixture of step (b) before the natural fibers are arranged in a mold cavity, which is then heated under a pressure to bring about the production of the plastic reinforced by natural fibers.

6 Claims, No Drawings

METHOD OF MAKING PLASTIC REINFORCED BY NATURAL FIBERS

FIELD OF THE INVENTION

The present invention relates to a method of making a plastic which is reinforced by natural fibers.

BACKGROUND OF THE INVENTION

The natural fiber filament of a natural fiber reinforced plastic differs from the plastic it is reinforcing by having a relatively small contraction rate. In general, the plastic is susceptible to a considerable degree of shrinkage upon being heated. For example, an unsaturated polyester can shrink as much as 5-7% when heated. As a result, a natural fiber reinforced plastic board often bulges when heated. There are various inexpensive natural fibers, such as coconut fibers, palm fibers, hemp fibers, etc., that can be used to reinforce plastic. However, these inexpensive natural fibers have not been used economically and effectively to reinforce a composite material.

SUMMARY OF THE INVENTION

The primary objective of the present invention is to provide a method of economically making a natural fiber reinforced plastic in high quantities.

The primary objective of the present invention is accomplished by a method of making a natural fiber reinforced plastic, which comprises the step of preparing a mixture by adding 30-300 parts by weight of a volatile organic foaming agent (with the exception of the fluoro-chloro-carbide), 0.5-3.0 parts by weight of an organic oxide catalyst, and a predetermined quantity of a filling agent to 100 parts by weight of an unsaturated polyester. The natural fiber is impregnated in the unsaturated polyester and is then hardened after being heated under a pressure. The manufacturing process includes:
(a) adding a predetermined amount of the filling agent to the foaming agent until the foaming agent is completely absorbed by the filling agent; (b) making a mixture containing the catalyst, the unsaturated polyester, and the mixture obtained in step (a); (c) placing the natural fibers, which have already been impregnated in the mixture obtained in step (b), in a mold cavity which is heated to a temperature ranging between 100 to 160 degrees Celsius under a pressure ranging between 30 to 150 kg/cm$^2$ or a period lasting between 30 to 45 seconds per millimeter thickness, and causing the foaming agent to evaporate completely, thereby resulting in the polyester foaming to take in the mold.

DETAILED DESCRIPTION OF THE INVENTION

An embodiment of the present invention is described hereinafter. The embodiment includes the following steps of:
(a) adding a predetermined quantity of an absorbent filling agent, such as wood powder, to a volatile organic foaming agent (with the exception of a fluoro-chloro-carbide), such as alcohol, until the foaming agent (alcohol) is completely absorbed by the filling agent (wood powder);
(b) preparing a mixture by adding an organic catalyst (such as benzoic acid peroxide) and the filling agent, impregnated with the foaming agent as described in step (a), to an unsaturated polyester;
(c) making natural fiber filaments, which have been cleansed and adjusted lengthwise and which contain less than 10% water, into a sheet-like object by either a weaving method or a non-weaving method; and
(d) arranging the sheet-like natural fiber object in a mold cavity and then placing a predetermined quantity of the mixture of the step (b) onto the sheet-like natural fiber object before closing the mold cavity and heating to a temperature ranging between 100 and 160 degrees Celsius and under a pressure ranging between 30 and 150 kg/cm$^2$ for a period lasting between 30 and 45 seconds per millimeter thickness. This causes the mixture to permeate the interstices of the natural fibers and the foaming agent (alcohol) to act on the unsaturated polyester, which is then converted into a saturated polyester while in the presence of the organic catalyst.

The mixture referred to in the step (b) contains the following constituents:

100 parts by weight of an unsaturated polyester; 30-300 parts by weight of a volatile organic foaming agent, preferably alcohol; 0.5-3.0 parts by weight of an organic peroxidase, such as peroxybenzoic acid; and a predetermined quantity of an absorbent filling agent, preferably wood powder.

The unsaturated polyester is prepared by adding dihydric alcohols and unsaturated maleic acid to p-dibenzoic acid, using styrene as a monomer as well as a diluent. In addition, the unsaturated polyester can be obtained from the recycling process of previously used food and beverage containers made of expanded polyester.

The unsaturated polyester containing p-dibenzoic acid has a shrinkage rate of about 5%, as compared with shrinkage rates of 6% and 7% for unsaturated polyesters containing m-dibenzoic acid and o-dibenzoic acid respectively. For this reason, the unsaturated polyester containing p-dibenzoic acid is used in the embodiment of the present invention described above.

Natural fiber filaments obtained from coconut, or palm, or hemp do not shrink when heated under the pressure. On the other hand, unsaturated polyester containing p-dibenzoic acid is subject to shrinkage on the order of 5% when heated under the pressure. In order to balance the shrinkage of the unsaturated polyester in the course of making a natural fiber reinforced plastic, the present invention uses alcohol as a foaming agent.

The present invention uses wood powder as a filling agent to absorb the alcohol that is acting as a foaming agent, for the following reasons: the alcohol and unsaturated polyester are incompatible; powder is an excellent absorbent material; and wood powder is similar in quality to natural fiber.

The present invention provides advantages over the prior art, which are explicitly set forth hereinafter.

According to the present invention, the natural fiber reinforced plastic is a man-made wood having a specific gravity that can be regulated by the quantity of the alcohol used as the foaming agent in the manufacturing process. When the quantity of alcohol used as a foaming agent is as low as 30 parts by weight, the plastic made by the method of the present invention has a higher specific gravity. On the other hand, the specific gravity of the plastic is lower when the amount of the alcohol used is as high as 300 parts by weight. Thus, the natural fiber reinforced plastic of the present invention may be used in place of natural wood, thereby reducing our dependence on forests for our supply of wood.

The natural fibers used in the method of the present invention can be obtained from various inexpensive sources. Furthermore, the unsaturated polyester used in the method of the present invention can be obtained from the recycling process of previously used food and beverage containers made of the expanded polyester. The present invention is therefore beneficial to our environment by conserving our natural resources.

The plastic (synthetic or man made wood) produced by the method of the present invention can be formed into a specific shape. In addition, the structural strength of the plastic is superior to that of natural wood whose structural strength is weakened by its wood grains. Unlike the natural wood, the plastic of the present invention is immune to decay caused by insect or mold infestation.

According to the method of the present invention natural fiber filaments can be impregnated with a mixture containing unsaturated polyester, and then made into either a bulk molding compound or a small molding compound for later use in making a plastic of a specific size or shape.

According to the embodiment of the present invention described above, one product sample so made has a specific gravity of 0.55 while another product sample has a specific gravity of 0.75. The third product sample is covered with a grained sheet made integrally for the purpose of enhancing the esthetic effect of the product.

What is claimed is:

1. A method of making a plastic reinforced by natural fibers comprising natural fibers and a mixture prepared by combining per 100 parts by weight of an unsaturated polyester with 30-300 parts by weight of a volatile organic foaming agent, 0.5-3.0 parts by weight of an organic peroxidase, and a predetermined quantity of a filling agent of wood powder, said natural fibers being impregnated in said mixture before being molded into a plastic in accordance with the following steps of:

(a) preparing a filling agent mixture by adding a predetermined quantity of a filling agent to a foaming agent which is absorbed completely by the filling agent;

(b) preparing an unsaturated polyester mixture by adding said filling agent mixture and a catalyst to said unsaturated polyester; and (c) impregnating said natural fibers in said unsaturated polyester mixture of said step (b) before said natural fibers are arranged in a mold cavity, which is then heated to a temperature ranging between 100 and 160 degrees Celsius under a pressure ranging between 30 and 150 kg/cm$^2$ for a period lasting between 30 and 45 seconds per millimeter thickness of said natural fiber impregnated with said unsaturated polyester mixture in said mold cavity, so as to cause said foaming agent to evaporate completely to bring about the foaming and the curing of said unsaturated polyester.

2. The method according to claim 1 wherein said unsaturated polyester is composed of p-dibenzoic acid.

3. The method according to claim 1 wherein said foaming agent is an alcohol.

4. The method according to claim 1 wherein said catalyst is peroxybenzoic acid.

5. The method according to claim 1 wherein said natural fibers are cleansed and said natural fibers having a water content of 10% or less.

6. The method according to claim 1 wherein said natural fibers referred to in said step (c) are of sheet-like construction and are covered with a predetermined quantity of said unsaturated polyester mixture in said mold cavity.

* * * * *